United States Patent
Klassen (10) Patent No.: US 7,444,135 B2
(45) Date of Patent: Oct. 28, 2008

(54) UPDATING AVAILABILITY OF AN INSTANT MESSAGING CONTACT

(75) Inventor: Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 65 days.

(21) Appl. No.: 11/176,263

(22) Filed: Jul. 8, 2005

(65) Prior Publication Data

US 2007/0010232 A1    Jan. 11, 2007

(51) Int. Cl.
*H04M 3/16* (2006.01)

(52) U.S. Cl. .................. 455/412.2; 455/418; 455/550.1; 709/206; 709/237

(58) Field of Classification Search .................. 455/418, 455/419, 420, 412.1, 412.2, 550.1; 709/203, 709/219, 206, 237
See application file for complete search history.

(56) References Cited

U.S. PATENT DOCUMENTS

| | | | |
|---|---|---|---|
| 2002/0097856 A1* | 7/2002 | Wullert, II | 379/201.01 |
| 2002/0143916 A1* | 10/2002 | Mendiola et al. | 709/223 |
| 2003/0125062 A1* | 7/2003 | Bethards et al. | 455/517 |
| 2003/0229722 A1* | 12/2003 | Beyda | 709/310 |
| 2004/0019695 A1* | 1/2004 | Fellenstein et al. | 709/239 |
| 2004/0158609 A1* | 8/2004 | Daniell et al. | 709/206 |
| 2006/0064464 A1* | 3/2006 | Kakivaya et al. | 709/206 |
| 2006/0075133 A1* | 4/2006 | Kakivaya et al. | 709/237 |

OTHER PUBLICATIONS

Day, M., et al., "Instant Messaging / Presence Protocol Requirements", (Feb. 2000).
Vogiazou, Yanna, "Wireless Presence and Instant Messaging", (Nov. 2002).
Wireless Village, "Presence Attributes Version 1.1", WV Internal Tracking No. WV-029, (2002).

* cited by examiner

*Primary Examiner*—Danh C Le
(74) *Attorney, Agent, or Firm*—Integral Intellectual Property Inc.; Miriam Paton (57) ABSTRACT

A contact is determined to be unavailable if a predetermined period of time has elapsed since an instant message was sent to the contact and an expected notification for the instant message was not received during that predetermined period of time by the device that sent the instant message. If the expected notification is a delivered notification, then the contact is deemed unreachable. If the expected notification is a read notification and a delivered notification for the instant message has been received by the device that sent the instant message, then the contact is deemed busy.

7 Claims, 7 Drawing Sheets

UPDATING AVAILABILITY OF AN INSTANT MESSAGING CONTACT

BACKGROUND

Instant messages are short text messages with no subject and no attachments sent directly from terminal to terminal within an instant messaging (IM) community. The messages are generally displayed to the user as part of a conversation. A member of an instant messaging (IM) community has a unique identifier ("contact name") in that community and can be added to the contact list of another member of the community using that identifier. For example, SMS is available only within the community of mobile telephone users, and the unique identifier is the telephone number.

Some IM systems include presence information about the availability of one's contacts for communication. Presence information is particularly important when a contact uses a wireless-enabled mobile device, because the contact may become unavailable with short notice due to battery loss, poor network coverage, and the like. Moreover, for wireless-enabled mobile devices that are always connected, the contact may appear to be available even if he or she is not.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
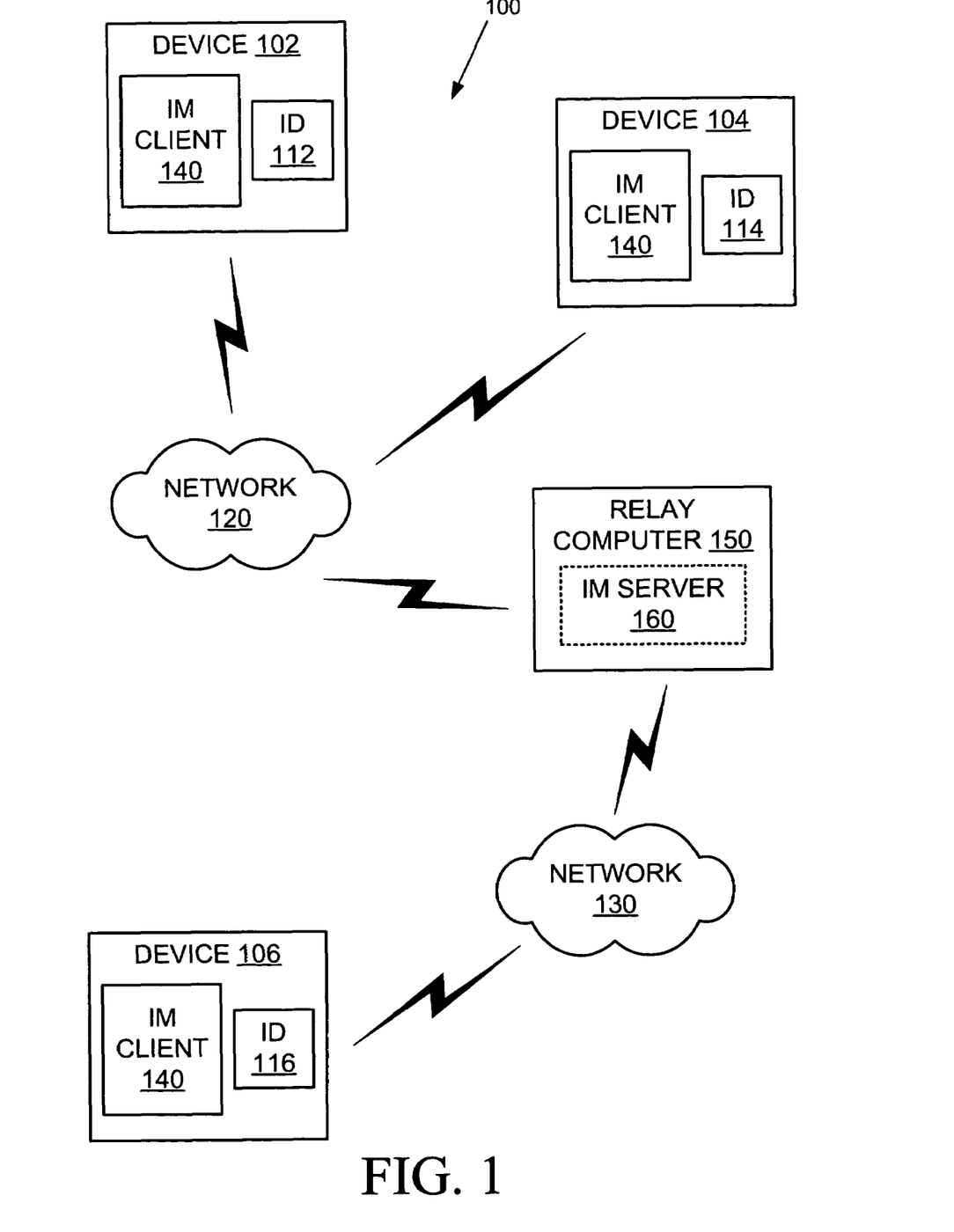
FIG. 1 is a simplified illustration of an exemplary communication system used for instant messaging, according to an embodiment.

FIG. 1 is a simplified illustration of an exemplary communication system 100 used for instant messaging (IM), according to an embodiment. System 100 includes devices 102, 104 and 106, respectively identified by identifiers 112, 114 and 116 in the instant messaging community. A non-exhaustive list of examples for devices 102, 104 and 106 includes workstations, notebook computers, laptop computers, desktop personal computers, personal digital assistants (PDAs), handheld computers, cellular telephones, smart cellphones, electronic mail (Email) clients, programmable consumer electronics, network PCs, and the like.

Devices 102 and 104 communicate to each other and to other devices in the instant messaging community via a network 120, and device 106 communicates to other devices in the instant messaging community via a network 130. A non-exhaustive list of examples for networks 120 and 130 includes a) wired networks such as the Internet, intranets, Ethernet networks, token rings, Universal Serial Bus (USB), wired networks according to the IEEE 1394-1995, IEEE 1394a-2000, and IEEE 1394b standards (commonly known as "FireWire"), or any combination thereof b) cellular networks such as Direct Sequence-Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication, and the like;

c) wireless local area networks such as 802.11, Bluetooth®, Zigbee™, ultra wideband (UWB) and the like; and d) optical communication networks.

Networks 120 and 130 may include any combination of additional communication devices (not shown) such as gateways, routers, switches, and the like.

An IM client 140 is installed on each of devices 102, 104 and 106. IM client 140 may be implemented in software, hardware, firmware or any combination thereof. When the user of device 102 sends an instant message to the user of device 104, the instant message is handled by IM client 140 on device 102, communicated to network 120, communicated to a relay computer or computers 150, and passed back to network 120 for communication to device 104. When the user of device 106 sends an instant message to the user of device 104, the instant message is handled by IM client 140 on device 106, communicated to network 130, communicated to relay computer(s) 150, and passed to network 120 for communication to device 104.

Relay computer(s) 150 identifies the contact through its unique identifier in the IM community and enables the instant message to be addressed to the appropriate device. If the instant message cannot be delivered to the contact's device, relay computer(s) 150 may store the instant message and attempt redelivery for a specified period of time, for example, 24 hours or 48 hours.

In some IM systems, an IM server 160 is incorporated into or coupled to relay computer(s) 150. In other IM systems, the IM functionality is enabled by IM clients 140 and no specific IM server is required.

Figure 2:
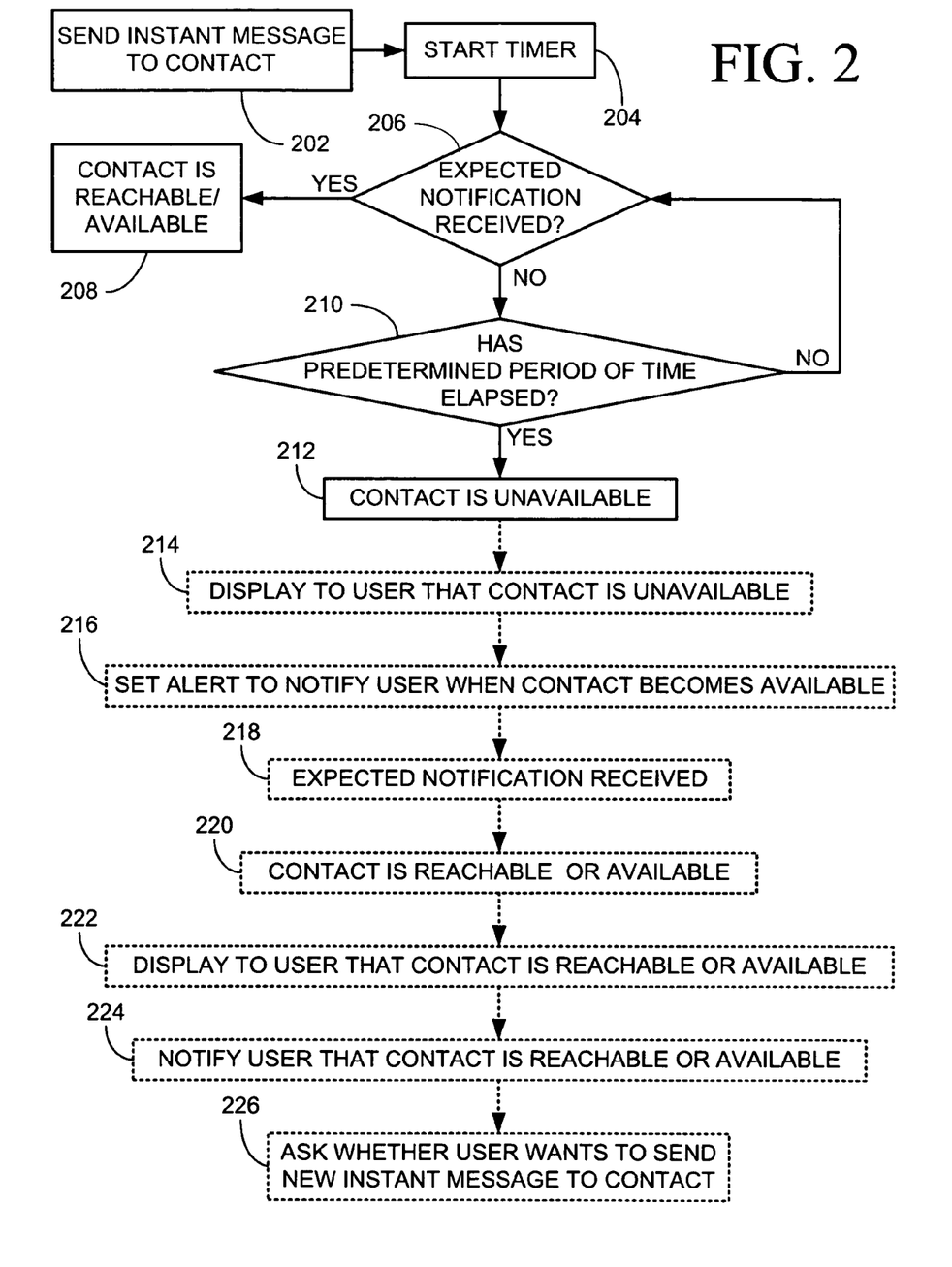
FIG. 2 is a flowchart of an exemplary method implemented by an instant messaging client on a device, according to some embodiments.

FIG. 2 is a flowchart of an exemplary method implemented by an instant messaging client on a device, according to some embodiments. The method of FIG. 2 will be explained with reference to FIGS. 3A-3D, 4A-4D, 5A-5C and 6A-6C, which are illustrations of an exemplary device and its display, according to some embodiments. In the exemplary device shown in FIGS. 3A-3D, 4A-4D, 5A-5C and 6A-6C, the user of the device has a contact name "Test", and the contact to whom the user of the device is sending instant messages has a contact name "User A".

Figure 3A:
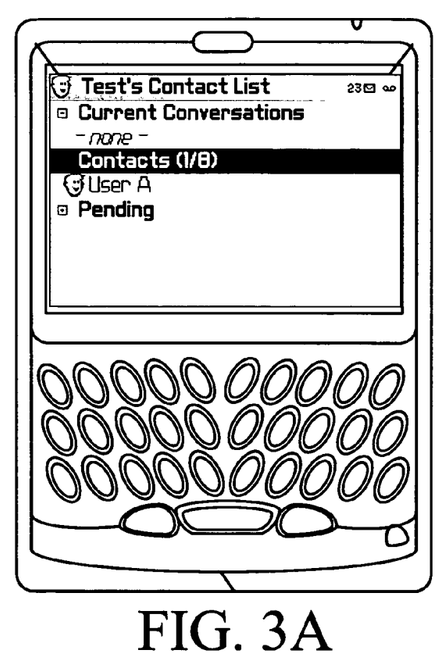
FIGS. 3A-3D, 4A-4D, 5A-5C and 6A-6C are illustrations of an exemplary device and its display, according to some embodiments.
Figure 3B:
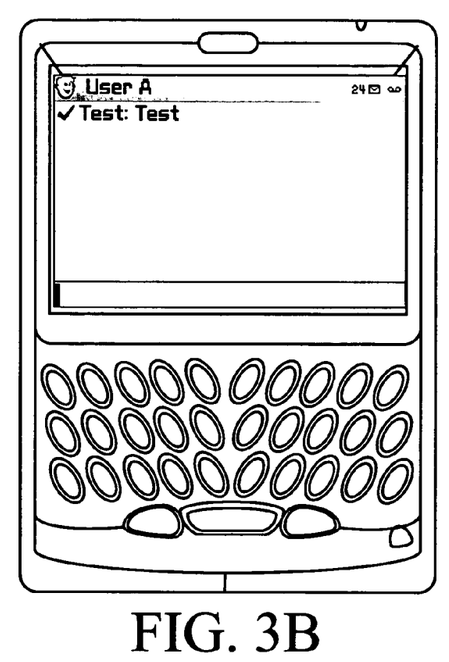

At 202, the IM client of a device sends an instant message to a contact. For example, in FIG. 3A, User A is listed in Test's contact list as available. In FIG. 3B, the checkmark next to the instant message with the text "Test" indicates that that instant message was successfully communicated to the network with which the device communicates.

At 204, the IM client starts a timer. The timer counts a predetermined period of time, which may be configurable. If before this predetermined period of time has elapsed an expected notification is received by the device, which is checked at 206, then at 208, the contact is reachable and/or available. If the predetermined period of time has elapsed, as checked at 210, and the expected notification has not yet been received by the device, then at 212 the IM client determines that the contact is unavailable.

For example, the expected notification may be a delivered notification for the instant message. It may be inferred from the lack of a timely delivered notification that the contact is unreachable. For example, if the contact has a wireless-enabled mobile device, low battery and/or poor network coverage may cause the instant message to not arrive at the contact's device.

Figure 3C:
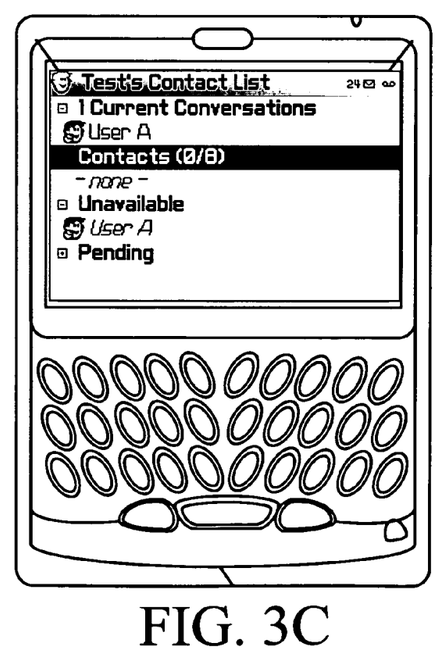
Figure 3D:
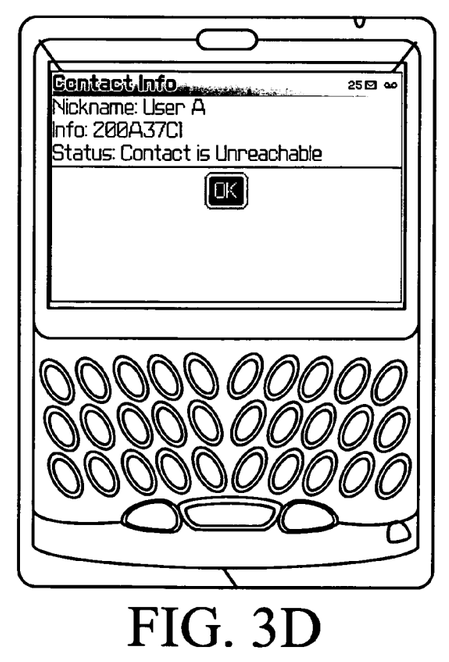

At 214, the IM client may display to the user of the device that the contact is unavailable. Since the device belonging to Test has not received a timely delivered notification for the instant message, FIG. 3C shows User A as unavailable, and FIG. 3D shows more information about the contact's state, namely that User A is unreachable.

In another example, the expected notification may be a read notification for the instant message. If the device receives a delivered notification for the instant message but does not receive a read notification for the instant message, it may be inferred from the lack of a timely read notification that the contact is reachable but busy.

Figure 4A:
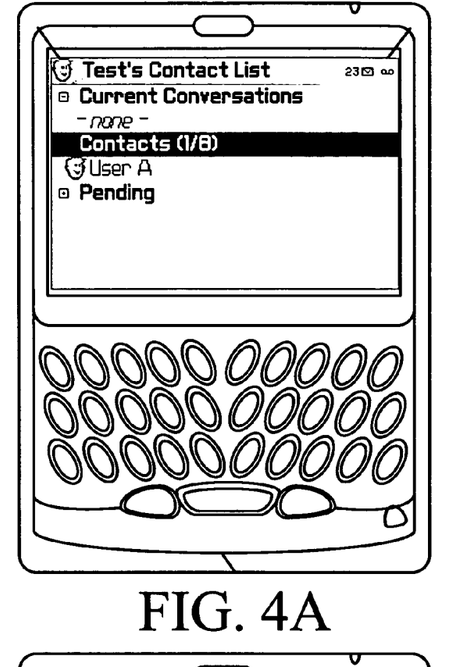
Figure 4B:
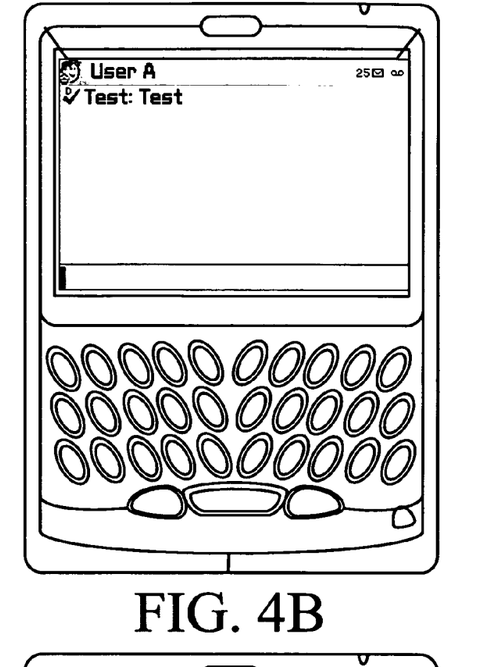
Figure 4C:
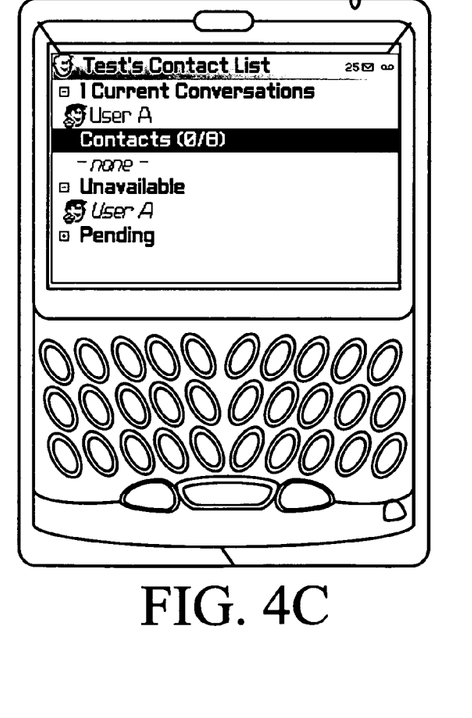
Figure 4D:
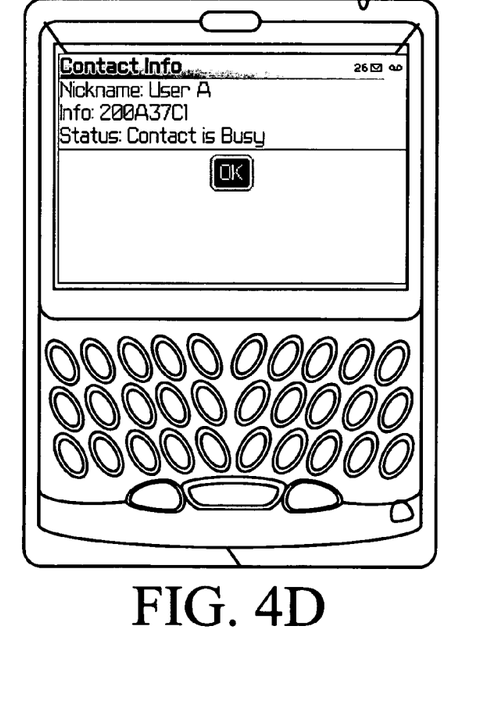

FIG. 4A shows that User A is available. FIG. 4B shows that Test has successfully sent an instant message, destined for User A with the text "Test", to the network. Since the device belonging to Test has received a delivered notification for the instant message but has not received a timely read notification for the instant message, FIG. 4C shows User A as unavailable, and FIG. 4D shows more information about the contact's state, namely that User A is busy.

Figure 5A:
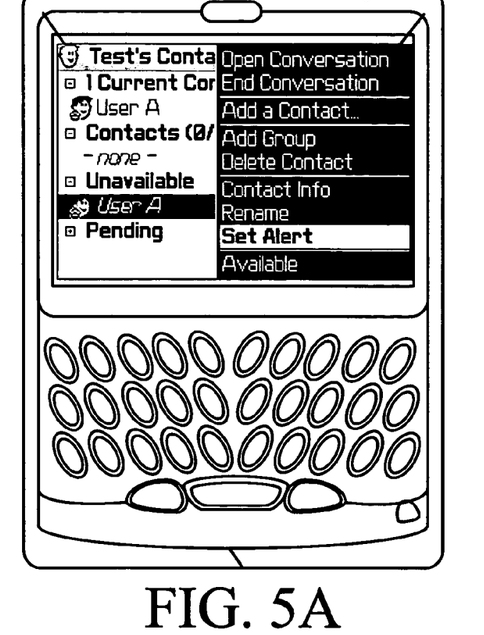
Figure 5B:
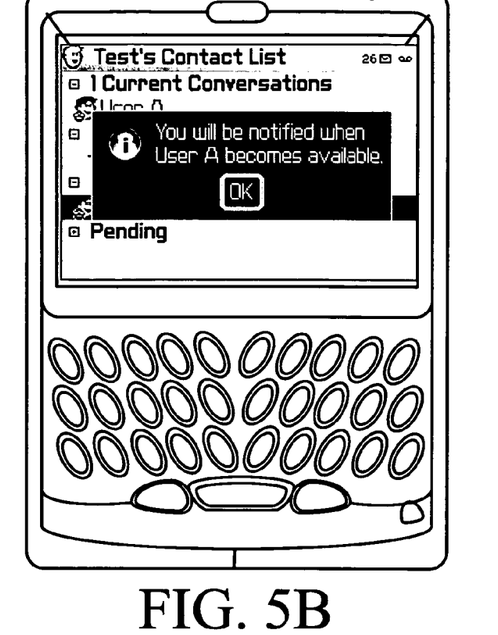
Figure 5C:
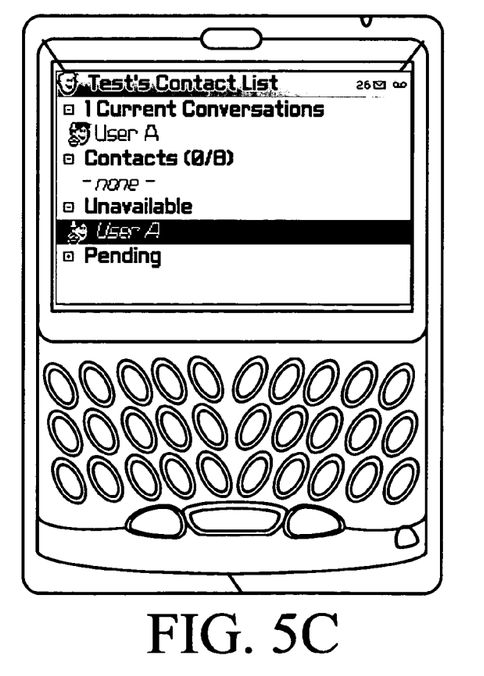

If the contact is unavailable, then at 216, the user of the device may wish to set an alert to be notified when the contact becomes available or reachable. For example, FIG. 5A shows an exemplary user-interface that enables the user of the device to set the alert for the unavailable contact User A. FIG. 5B shows that the alert has been set. FIG. 5C shows that after the alert has been set, User A is still shown as unavailable.

If the expected notification is received after the predetermined period of time has elapsed, as at 218, then at 220 the IM client of the device determines that the contact is reachable (for example, in the case of a belated delivered notification) or available (for example, in the case of a belated read notification). At 222, the IM client may display to the user of the device the updated availability status of the contact.

Figure 6A:
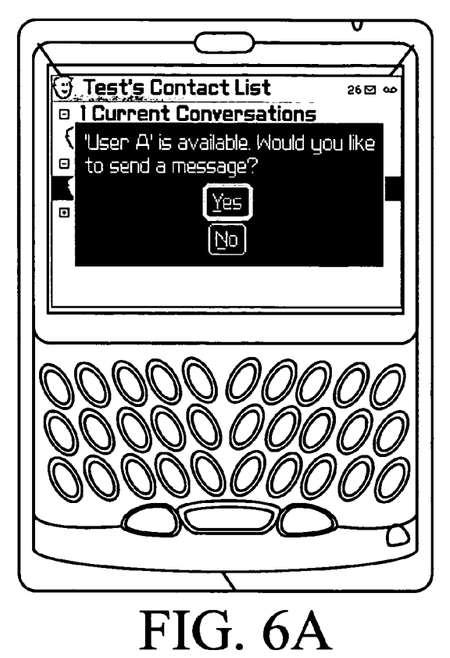
Figure 6B:
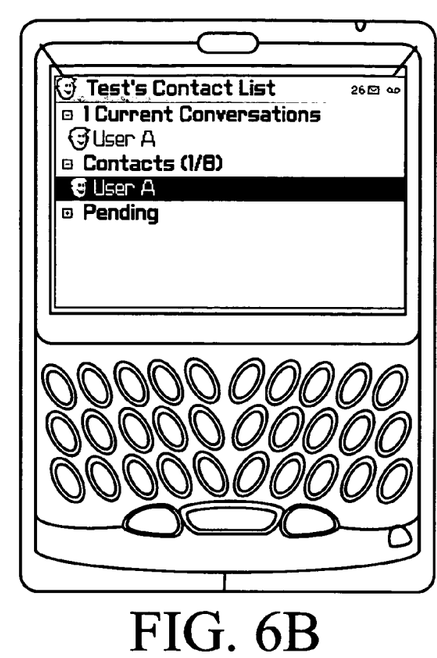
Figure 6C:
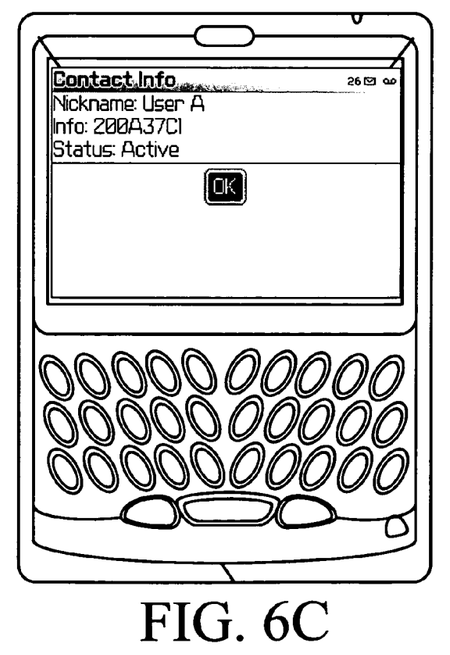

If an alert has been set at 216, then at 224, one or more user interface elements of the device are used to notify the user of the device that the contact is now reachable or available, as appropriate. A non-exhaustive list of examples for the one or more user interface elements includes a vibrator, a sound source, a light source, and any other suitable user interface element. As shown in FIG. 6A, once the device has determined that User A is available, the user of the device is notified by way of a dialog box displayed on the display of the device. FIG. 6B shows that User A is available, and FIG. 6C shows more information about the contact's state, namely that User A is active.

An example for the predetermined period of time may be about 2 minutes. Other values for the predetermined period of time are also contemplated. If the predetermined period of time is too short, then the status of contacts will be changed too often. The predetermined period of time may be set taking into account network and natural delays in receiving the expected notification. If the predetermined period of time is too long, then the status of contacts may be changed too slowly. For example, a contact who appears to be available but is in fact unavailable will continue to appear available for too long.

Figure 7:
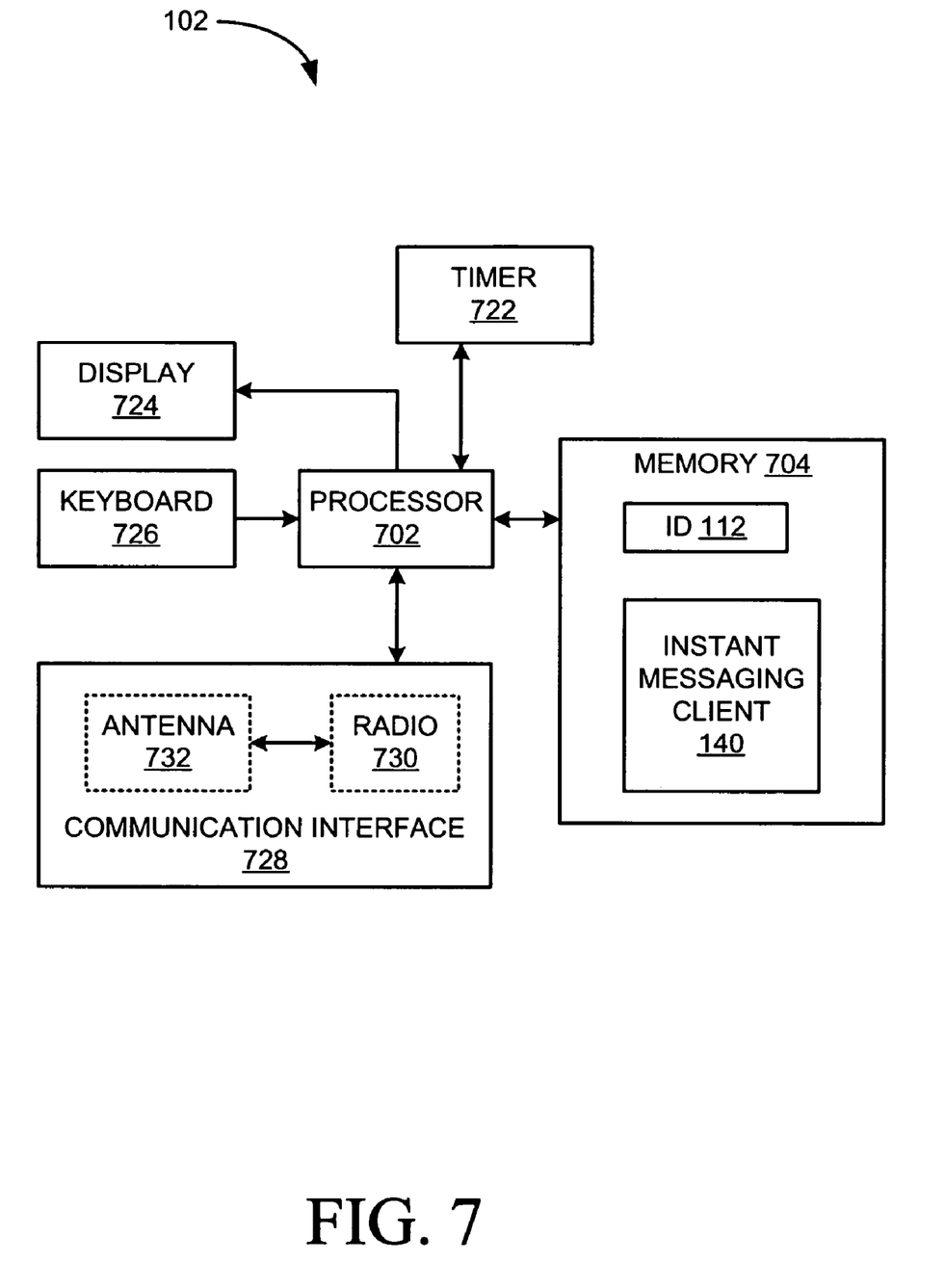
FIG. 7 is a block diagram illustration of an exemplary device, according to some embodiments.

FIG. 7 is a block diagram illustration of an exemplary device, for example, device 102, according to some embodiments. Device 102 includes a processor 702 and a memory 704 coupled to processor 702. Memory 704 stores the unique identifier 112 of device 102 in the IM community, and also stores IM client 140 or the software portion thereof.

Device 102 includes a display 724 and a keyboard 726, both coupled to processor 702, and may include additional user interface components that are not shown in FIG. 7. Keyboard 726 may be embedded in full or in part within display 724, i.e. display 724 may be a "touch screen". A timer 722 may be controlled by processor 702, and may be implemented by software, by hardware or by any combination thereof.

Device 102 includes a communication interface 728, coupled to processor 702, that is able to communicate with network 120. If network 120 is a cellular network or any other type of wireless network, communication interface 728 may include a radio 730 and an antenna 732. Otherwise, if network 120 is a wired network, communication interface 728 may include other interfacing elements suitable to interact with network 120.

A non-exhaustive list of examples for processor 702 includes a microprocessor, a microcontroller, a central processing unit (CPU), a digital signal processor (DSP), a reduced instruction set computer (RISC), a complex instruction set computer (CISC) and the like. Furthermore, processor 702 may comprise more than one processing unit, may be part of an application specific integrated circuit (ASIC) or may be a part of an application specific standard product (ASSP).

Memory 704 may be fixed in or removable from device 102. Memory 704 may be coupled to processor 702 or partly embedded in processor 702. A non-exhaustive list of examples for memory 704 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antenna 732 includes a dipole antenna, a monopole antenna, a multilayer ceramic antenna, a planar inverted-F antenna, a loop antenna, a shot antenna, a dual antenna, an omnidirectional antenna and any other suitable antenna.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for updating availability information of a contact that is stored in a device, the method comprising:
    storing in said device an identifier that identifies said device in an instant messaging system;
    determining at said device that said contact is unavailable if a predetermined period of time has elapsed since said device sent an instant message to said contact during which said device has not received an expected notification for said message, wherein said expected notification was a delivered notification for said message;
    determining that said contact is unreachable;
    enabling a user of said device to request to be notified if and when said contact becomes reachable;
    upon receipt of said delivered notification after said predetermined period of time has elapsed, determining that said contact is reachable and notifying said user that said contact is reachable; and
    asking said user whether said user wants to send another instant message to said contact.

2. A device able to communicate in an instant messaging system having one or more types of notifications for instant messages, the device comprising:
    a communication interface through which said device is able to send instant messages to and receive instant messages from a network;
    a processor coupled to said communication interface;
    a user input component coupled to said processor through which a user of said device is able to provide content for said instant messages;
    a user output component coupled to said processor through which said device is able to display said instant messages and selected notifications to said user; and
    memory to store an identifier that identifies said device in said instant messaging system and to store code which, when executed by said processor, determines that a contact is unavailable if a predetermined period of time has elapsed since said device sent an instant message to said contact during which said device has not received an expected notification for said message.

3. The device of claim 2, wherein said communication interface further comprises a radio and an antenna.

4. The device of claim 2, wherein said expected notification was a delivered notification for said message and said code, when executed by said processor, determines that said contact is unreachable.

5. The device of claim 4, wherein said memory is to store code which, when executed by said processor, enables a user of said device to request to be notified if and when said contact becomes reachable.

6. The device of claim 2, wherein said expected notification was a read notification for said message and said code, when executed by said processor, determines that said contact is busy if a delivered notification for said message has been received by said device and said predetermined period of time has elapsed since said device sent an instant message to said contact during which said device has not received said read notification.

7. The device of claim 2, wherein said memory is to store code which, when executed by said processor, enables a user of said device to request to be notified if and when said contact becomes available.

* * * * *